(12) United States Patent
Malczewski et al.

(10) Patent No.: US 6,594,010 B2
(45) Date of Patent: Jul. 15, 2003

(54) EMISSION SPECTROMETER HAVING A CHARGE COUPLED DEVICE DETECTOR

(75) Inventors: Mark Leonard Malczewski, North Tonawanda, NY (US); Joseph Wegrzyn, Sanborn, NY (US); Wayne Donald Martin, Wheatfield, NY (US)

(73) Assignee: Praxair Technology, Inc., Danbury, CT (US)

( * ) Notice: Subject to any disclaimer, the term of this patent is extended or adjusted under 35 U.S.C. 154(b) by 187 days.

(21) Appl. No.: 09/899,875

(22) Filed: Jul. 6, 2001

(65) Prior Publication Data

US 2003/0007146 A1 Jan. 9, 2003

(51) Int. Cl.[7] .................................................. G01J 3/30
(52) U.S. Cl. ........................................ 356/311; 356/316
(58) Field of Search ................................ 356/311, 316, 356/318, 326, 317; 250/288

(56) References Cited

U.S. PATENT DOCUMENTS

| 2,943,223 A | * | 6/1960 | Fay | |
| 3,032,654 A | * | 5/1962 | Fay | |
| 5,412,467 A | * | 5/1995 | Malczewski et al. | 356/316 |
| 5,831,728 A | * | 11/1998 | Malczewski et al. | 356/316 |
| 6,473,175 B1 | * | 10/2002 | Malczewski | 356/311 |

* cited by examiner

Primary Examiner—Frank G. Font
Assistant Examiner—Layla Lauchman
(74) Attorney, Agent, or Firm—Iurie A. Schwartz

(57) ABSTRACT

An analyzer suitable for performing continuous gas analysis in ultra-high purity applications. The analyzer combines a low-level emission source and a gaseous emission spectrometer having a charge coupled device (CCD) diode array as a detector. The CCD detector replaces one or more photomultipliers and narrow bandpass filters typically used in spectrometers. The analyzer performs various processing operations to evaluate and eliminate the effect of background light level, or dark spectrum.

35 Claims, 11 Drawing Sheets

EMISSION SPECTROMETER HAVING A CHARGE COUPLED DEVICE DETECTOR

FIELD OF THE INVENTION

The present invention relates generally to an analyzer having a charge coupled device based emission spectrometer for ultra-high purity gas analysis.

BACKGROUND OF THE INVENTION

For many years, gaseous emission spectroscopy has been used for the analysis of nitrogen in argon (see e.g., U.S. Pat. No. 3,032,654). A commonly used emission source for this technique is a low-energy argon plasma, also known as a silent electric discharge (SED). This technology has improved over the years to lower the limit-of-detection (LOD) to single digit parts-per-billion (ppb) levels; for example, through the use of electro-optical modulation (see, e.g., U.S. Pat. No. 5,412,467). Further improvements in sample cell design, electronics, and the microprocessor platform have led to the current generation of spectroscopic analyzers. The current practice of using multiple detectors and optical filters allows for the simultaneous analysis of multiple impurities if suitable emission wavelengths can be found.

Figure 1A:
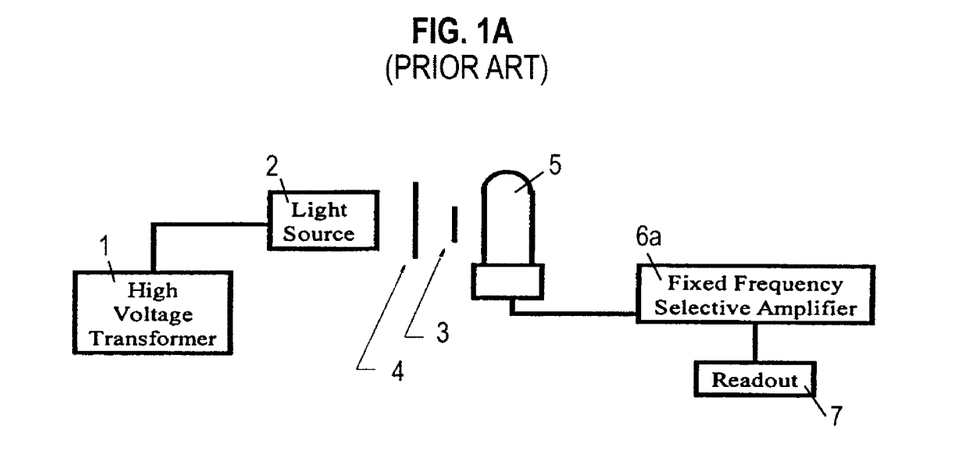
FIGS. 1A and 1B are system block diagrams of a conventional emission spectroscopy system and an electro-optical modulation emission spectroscopy system, respectively.
Figure 1B:
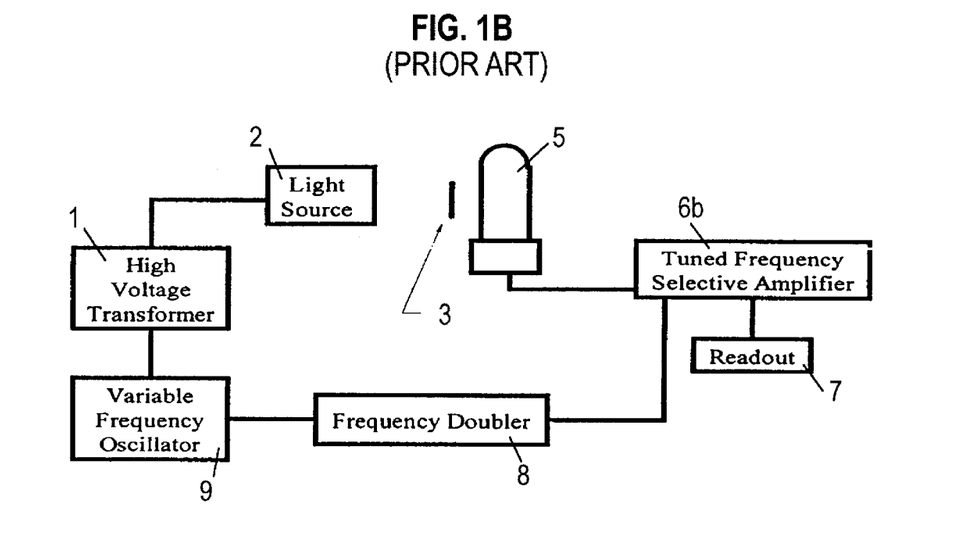

The block diagram in FIG. 1A shows the emission and detection systems utilized in connection with early analyzers that perform conventional emission spectroscopy. Similarly, FIG. 1B is a block diagram for a state-of-the-art analyzer design using electro-optic modulation, as described in U.S. Pat. No. 5,412,467. In both types of systems, a high voltage transformer 1 powers a light source 2 containing a gaseous sample to be analyzed. The gases are excited by the voltage to produce optical emission lines (an emission spectrum) characteristic of each gas (impurity) in the sample. Narrow bandpass optical filters 3 isolate the strongest emission line corresponding to each impurity. Photomultipliers (PMTs) 5 convert the light output from each impurity to a current which is amplified by a frequency selective amplifier, either a fixed amplifier 6a as in FIG. 1A or a tuned amplifier 6b as in FIG. 1B, and readout 7. The conventional system uses a chopper wheel 4 to interrupt (or modulate) the light to the PMT. Whereas, the electro-optic modulation system uses a frequency doubler 8 and variable frequency oscillator 9 to modulate the light to the PMT.

To date, each generation of emission spectrometer has shared a common detection scheme. The emission line of the impurity of interest is isolated by a narrow bandpass optical filter and converted to an electrical signal through the use of a photomultiplier tube. The PMT has been the detector of choice for numerous applications in low light level spectroscopy due to the inherent high electronic gain possible through the use of the PMT. In addition to sensitivity, the PMT is also rugged, reliable, low cost, and stable over long periods of time. These are important attributes when used in a continuous-use application, such as emission spectroscopy. However, PMTs do pose several problems when used as detectors for emission spectroscopy. PMTs are comparatively large devices by today's standards, particularly when several PMTs must be used in a single analyzer. Although PMTs are low cost, the high-quality narrow bandpass filters are not, especially when several filters are needed. Moreover, the narrow bandpass filters, which isolate the emission line of interest for a given impurity, also prevent evaluation of the background light level at the wavelength chosen for analysis.

The background light level at the impurity emission wavelength of interest can change for a variety of reasons, such as changes in temperature, sample gas pressure, excitation conditions, or other impurities entering the discharge. It is extremely difficult to distinguish background light level shifts from a changing concentration of the impurity of interest when only the emission intensity at the wavelength of interest is known. Shifts in background light level can result in problems with long term baseline drift, nonlinear calibration curves, and cross sensitivity to other impurities. These are all serious problems when attempting to perform impurity analysis on impurities with measurements in the parts per billion.

Figure 2:
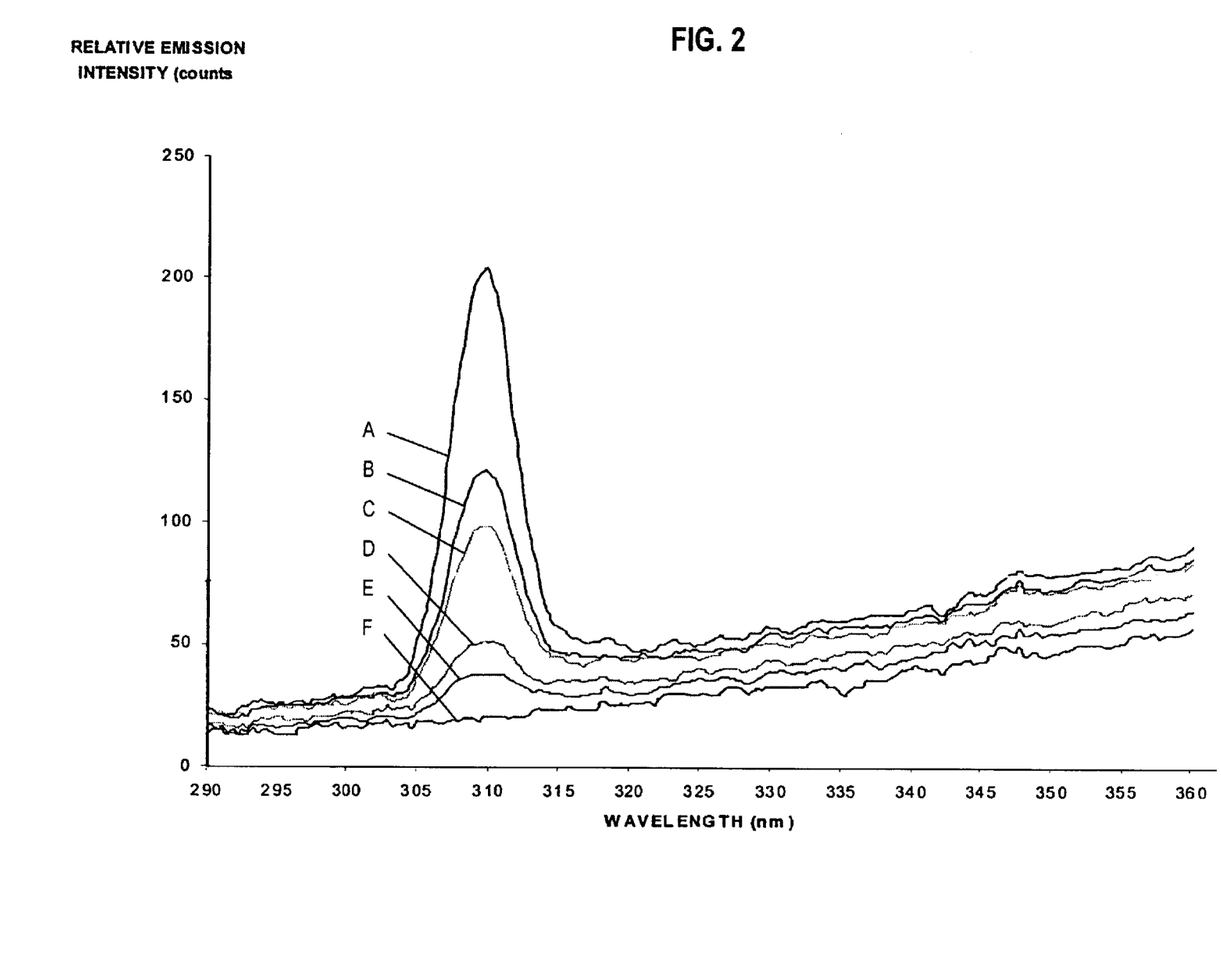
FIG. 2 is a graph of moisture-only emission spectra showing a baseline shift in the nitrogen emission region.

FIG. 2 illustrates the problem inherent in using the PMT and optical filter approach. FIG. 2 shows six emission spectra labeled A–F; that respectively correspond to 86, 56, 38, 25, 9 and 0 ppb concentrations of moisture (water vapor) in an argon sample gas. Each spectrum shows the region of the ultraviolet (UV) spectrum where both moisture and nitrogen have characteristic emission lines. Note that the addition of moisture causes a rise in the baseline light level, particularly in the region of the spectrum (333–360 nm) where nitrogen characteristically emits. If a PMT and optical filter are used, this increased light level could be interpreted as coming from a nitrogen impurity, resulting in an erroneously high concentration of nitrogen being reported. However, if the baseline light level shift is evaluated properly, the fact that no nitrogen emission peak is present can be correctly determined, and hence the nitrogen concentration is actually zero. The same argument applies to baseline shifts due to other factors, as mentioned above, which show up as noise and drift in the analytical results if not taken into account. Two approaches have been proposed to address the problem of changing baseline light level.

First, a separate PMT detector can be dedicated to determining the baseline emission light level rather than analyzing for an impurity. This is done by choosing a narrow bandpass filter that isolates a wavelength region of the sample gas emission spectrum close to, but not including, the impurity emission lines of interest. The analyzer then uses the ratio of the signal from the PMT measuring the impurity emission and the signal from the PMT monitoring the baseline. This approach eliminates many of the problems of the baseline emission light level. However, this technique is more complicated and requires either an additional PMT and optical filter or a reduction in the number of impurities which can be detected.

In the second approach, the baseline drift and some of the nonlinearity in the calibration curve of the analyzer are compensated for mathematically. The application of such a correction to each impurity analysis is implemented as part of the operating program of the analyzer. However, this approach is only possible if the nonlinearity is well characterized from previous experimental work.

The ability of a charge coupled device (CCD) array to easily evaluate the entire region of the spectrum of interest makes them an attractive detector choice for a number of spectroscopic methods. CCD arrays have been used in place of PMTs and narrow bandpass filters for spectroscopic applications for a number of years and small, low-cost, commercial units are available. The best known units are used for inductively coupled plasma (ICP) emission spectroscopy. These applications are well understood, but involve the use of very intense emission sources, typically ICP or microwave sources. These emission sources are far more intense and more energetic than the low-level emission sources in gas emission analyzers.

CCD arrays consist of an array of detector elements (pixels), each of which is a photodiode. However, CCDs lack the inherent high gain capability of a PMT. In this respect, the pixels act like photographic film. Low light images can be captured using longer integration times, much like a long exposure time is used with a conventional camera. However, long integration times worsen a problem inherent to CCD arrays; the so-called dark or thermal noise. If an array is left in complete darkness, it will generate a unique noise signature that is a function primarily of integration time and temperature. Managing this changing noise signature is key to using this technology when low intensity sources are to be detected.

Because of this dark noise problem, a brighter emission is needed from the impurity of interest in order to generate a useable signal from the CCD array detector. Heretofore, applications that normally use low light level emission sources with a PMT detector, such as gaseous emission spectroscopy, have required a brighter emission source if a CCD detector is to be used. Generally, a much more complicated power source is needed to achieve this brighter emission. This can significantly increase the cost, size, and complexity of the analyzer.

Therefore, a need exists for an analyzer, such as a gaseous emission spectrometer, having a CCD detector array that uses a simple low light level emission source, such as a silent electric discharge.

OBJECTS OF THE INVENTION

It is therefore an object of the present invention to provide an improved gaseous emission spectrometer.

It is a further object of the present invention to perform gaseous emission spectroscopy using a low-level emission source and a CCD detector array.

It is another object of the present invention to produce a small, low-cost, rugged analyzer for performing gaseous emission spectroscopy.

Other objects and advantages of the invention will in part be obvious and will in part be apparent from the specification and the drawings.

SUMMARY OF THE INVENTION

To attain the above-mentioned objects, the invention provides an analyzer for performing gaseous emission spectroscopy. The analyzer has an analytical cell containing a gas sample for spectrum analysis. The analytical cell is preferably a microcell. A transformer provides a voltage to the gas sample in the analytical cell sufficient to produce a low-level emission source from the gas sample. The low-level emission source can be a silent electric discharge. A spectrometer then detects the emission spectrum from the low-level emission source. The spectrometer uses a charge coupled device array as the detector. A computer is used to control the analyzer and process the emission spectrum detected by the spectrometer. The computer subtracts a dark spectrum representing thermal noise from the charge coupled device detector from the emission spectrum. The computer also uses a calibration curve to calculate an impurity concentration for various impurities in the gas sample. A fiber-optic cable is used to couple the light emitted from the low-level emission source into the spectrometer. This analyzer can be used to analyze an ultra-high purity gas sample provided to the analytical cell in a continuous flow.

Another embodiment of the invention is an analyzer wherein the spectrometer generates an initial dark spectrum and the computer subtracts the initial dark spectrum from each emission spectrum.

A further embodiment of the invention is an analyzer wherein the computer monitors the temperature of the spectrometer and controls the spectrometer to generate an updated dark spectrum when a predetermined temperature change occurs. The computer then subtracts the updated dark spectrum from the emission spectrum.

A further embodiment of the invention is an analyzer wherein the computer dynamically determines and masks hot pixels in the charge coupled device detector, so that the masked hot pixels are not used in the spectrum analysis.

To further attain the above-mentioned object, the invention also provides a method of processing emission spectra from an analyzer having a charge coupled device array based gaseous emission spectrometer and a low-level emission source. The method first acquires a dark spectrum from the charge coupled device array. This dark spectrum represents thermal noise from the charge coupled device array. The dark spectrum is acquired by measuring the output of the charge coupled device array without incident light. A sample spectrum is acquired from the low-level emission source using the charge coupled device array. The low-level emission source is produced from a gas sample in an analytical cell. The dark spectrum is subtracted from the sample spectrum to obtain a corrected sample spectrum. A baseline is then determined for the corrected sample spectrum. Next, the emission peak and baseline areas for the emission peak region of the corrected sample spectrum are integrated. The baseline area is subtracted from the emission peak area to obtain a peak area. This peak area is then converted into an impurity concentration. This conversion uses a calibration curve to calculate the impurity concentration for various impurities in the gas sample. The low-level emission source is preferably a silent electric discharge. The analytical cell is preferably a microcell. A fiber-optic cable is used to couple the light emitted by the low-level emission source into the spectrometer. This method can be used to analyze an ultra-high purity gas sample provided to the analytical cell in a continuous flow.

Another embodiment of the invention is a method wherein the dark spectrum acquiring step acquires the dark spectrum when the spectrometer exceeds a predetermined temperature change from the temperature at which the dark spectrum was last acquired.

A further embodiment of the invention is a method wherein the dark spectrum subtracting step determines and dynamically masks hot pixels in the charge coupled device array, so that the masked hot pixels are not used in the spectrum analysis.

For a more complete understanding of the invention, reference is made to the following description and accompanying drawings, in which.

DETAILED DESCRIPTION OF THE PREFERRED EMBODIMENTS

The preferred embodiments of the apparatus and method according to the present invention will be described with reference to the accompanying drawings.

Figure 3:
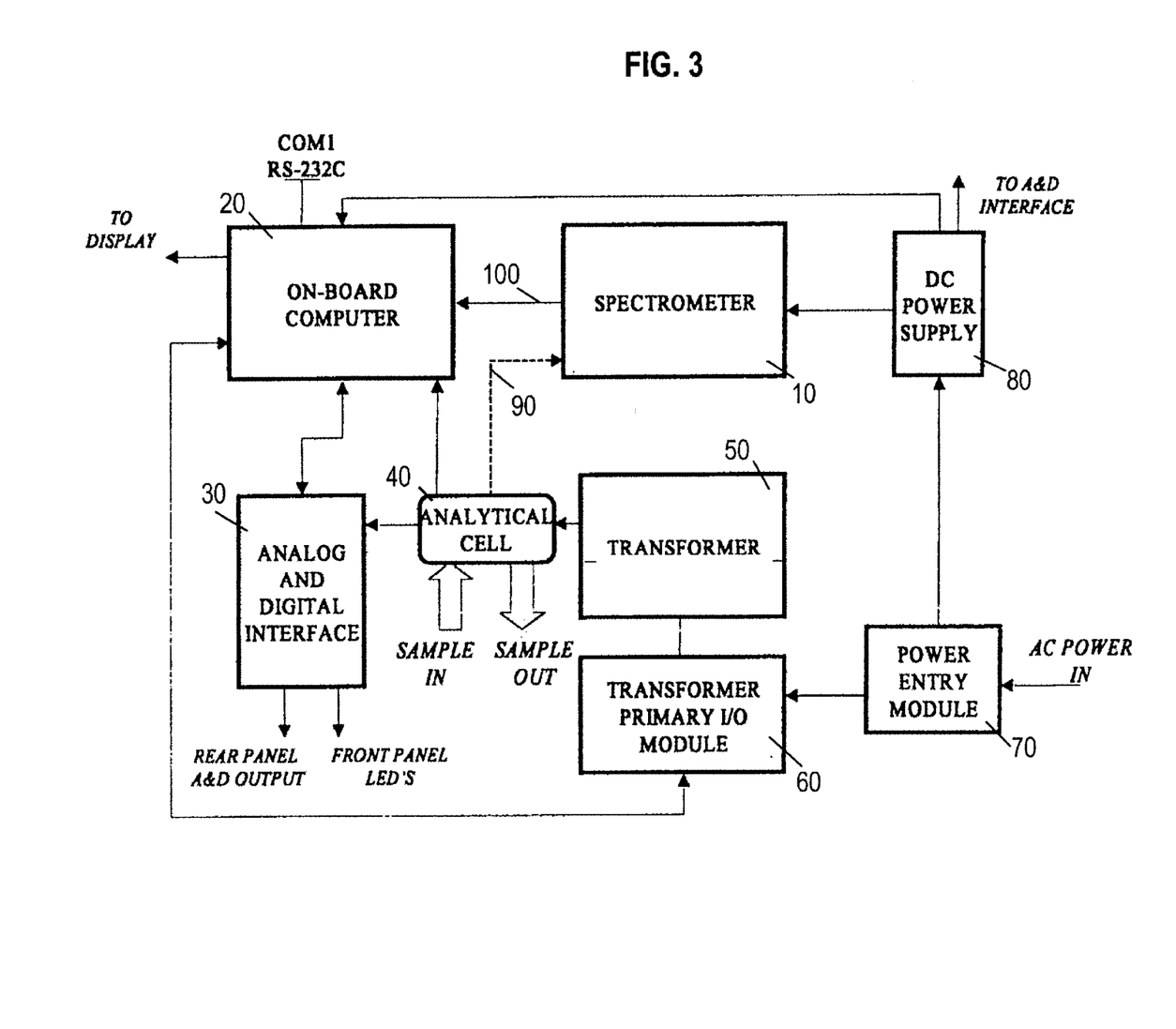
FIG. 3 is a block diagram of an analyzer using a CCD based emission spectrometer according to a preferred embodiment of the present invention.

Referring to FIG. 3, a block diagram of an exemplary analyzer using a CCD array based emission spectrometer, which is the preferred embodiment of the present invention, is shown. Of course, other configurations of elements employing the CCD array based emission spectrometer may also be used. The analyzer shown in FIG. 3 includes a spectrometer 10, an on-board computer 20, an analog and digital interface 30, an analytical cell 40, a transformer 50, a transformer primary input/output module 60, a power entry module 70, and a DC power supply 80.

During operation, a gas sample to be analyzed is placed in the analytical cell 40. A preferred sample system is the Praxair microcell described in U.S. Pat. No. 6,043,881, incorporated herein by reference. The advantages of the simple microcell sample system are discussed below. The transformer 50 supplies a voltage to the analytical cell 40 sufficient to produce a low energy, low intensity plasma discharge from the gas sample. A fiber-optic cable 90 transfers the light from the emission source (i.e. the gas sample) from the analytical cell 40 to the spectrometer 10. This CCD array based spectrometer 10 is the heart of the system and is described below in more detail. The spectrometer 10 determines the spectrum of the emitted light. The spectrometer 10 has a small internal computer (not shown) which communicates with the on-board computer 20 through a serial link 100. The on-board computer 20 runs an operating program that controls the analyzer. Spectra obtained by the spectrometer 10 are sent through serial link 100 to the on-board computer 20. The on-board computer 20 analyzes the incoming spectra and converts the emission lines into concentration information corresponding to one or more impurities in the sample gas. The on-board computer 20 receives various analog and discrete inputs/outputs and can communicate with the user either through these outputs, or preferably through a direct serial connection (e.g., a RS-232C port). In fact, most of the modules shown in FIG. 3 have serial port connections. Of course, Universal Serial Bus (USB) connections, or any other methods for linking components, including the use of a bus architecture may be employed. The spectrometer's computer can also receive and carry out a predetermined limited set of instructions. In this manner the on-board computer 20 can control and receive data from the spectrometer 10 without having to control the detailed operations and internal timing of the spectrometer 10. The transformer primary I/O module 60 allows the on-board computer 20 to control the transformer 50 and turn the discharge on and off as necessary. This is critical for management of the dark spectrum, which is discussed later.

The spectrometer 10 comprises a small handheld optical bench and CCD detector. The light from the emission source is brought into an entrance slit of the optical bench. After reflecting off two mirrors and a reflective grating, the light is dispersed onto the CCD array. The CCD is preferably a linear array of 2,048 photodiode detector elements. Each detector element receives light corresponding to a narrow wavelength range (on the order of 2 nm). The incident wavelength on each photodiode is determined by the resolution of the grating, the geometry of the optical bench, and the position of the specific photodiode within the array. Of course, other CCD array technologies may be employed as desired.

CCD based spectrometers 10 are commercially available and are lightweight, compact, and rugged. In conjunction with the small optical bench, these CCD arrays can cover a complete spectrum of 200 nm to 800 nm. This region encompasses the far and near ultraviolet, the complete visible, and a small portion of the near infrared region of the electromagnetic spectrum.

To convert the incident light into an electrical signal, each diode in the array, alternatively referred to as a pixel, is a small area of semiconductor material connected in parallel to a small charged capacitor. As photons strike the semiconductor material, electron hole pairs are formed which migrate to the opposite plates of the capacitor, causing it to slowly discharge. After a predetermined time (i.e. an integration time), the CCD's electronics rapidly recharge each of the 2,048 capacitors. This recharge resets the CCD array for the next integration period. The charge necessary to fully recharge each capacitor is a function of the number of photons incident on the photodiode during the integration time. A plot of the amount of charge incident on each photodiode during an integration period versus wavelength reveals the spectrum of the emission source.

An important factor is the total amount of light incident on each photodiode during the integration time. Because these diodes are integrating devices, the arrival pattern of the photons is unimportant. Only the total number of incident photons is important. In this respect, the array acts like photographic film. A picture can be captured in low light conditions by leaving the shutter open for a longer period of time. In the same way, the spectrometer's sensitivity can be improved when using a low intensity emission source by increasing the integration time. However, two factors act to limit the integration time.

First, the integration time cannot be so long that the capacitors of one or more of the diodes becomes fully discharged during the integration time. When a capacitor becomes fully discharged, a saturation condition is reached and the diodes are unable to respond to further incident photons during the remainder of the integration period. Therefore, it is not possible to determine differences in signal level for those pixels that have reached saturation.

Of greater concern is the thermal noise generated by the CCD array. If an array is left in complete darkness, it will still generate a characteristic noise signature. This thermal noise, sometimes referred to as the dark spectrum, worsens at higher temperatures and longer integration times. Managing this temperature-dependent dark spectrum is key to using CCD arrays with low intensity emission sources, which require longer integration times. The present invention addresses the problems inherent in managing this dark spectrum so that CCDs can be practically used with low intensity emission sources.

Figure 4:
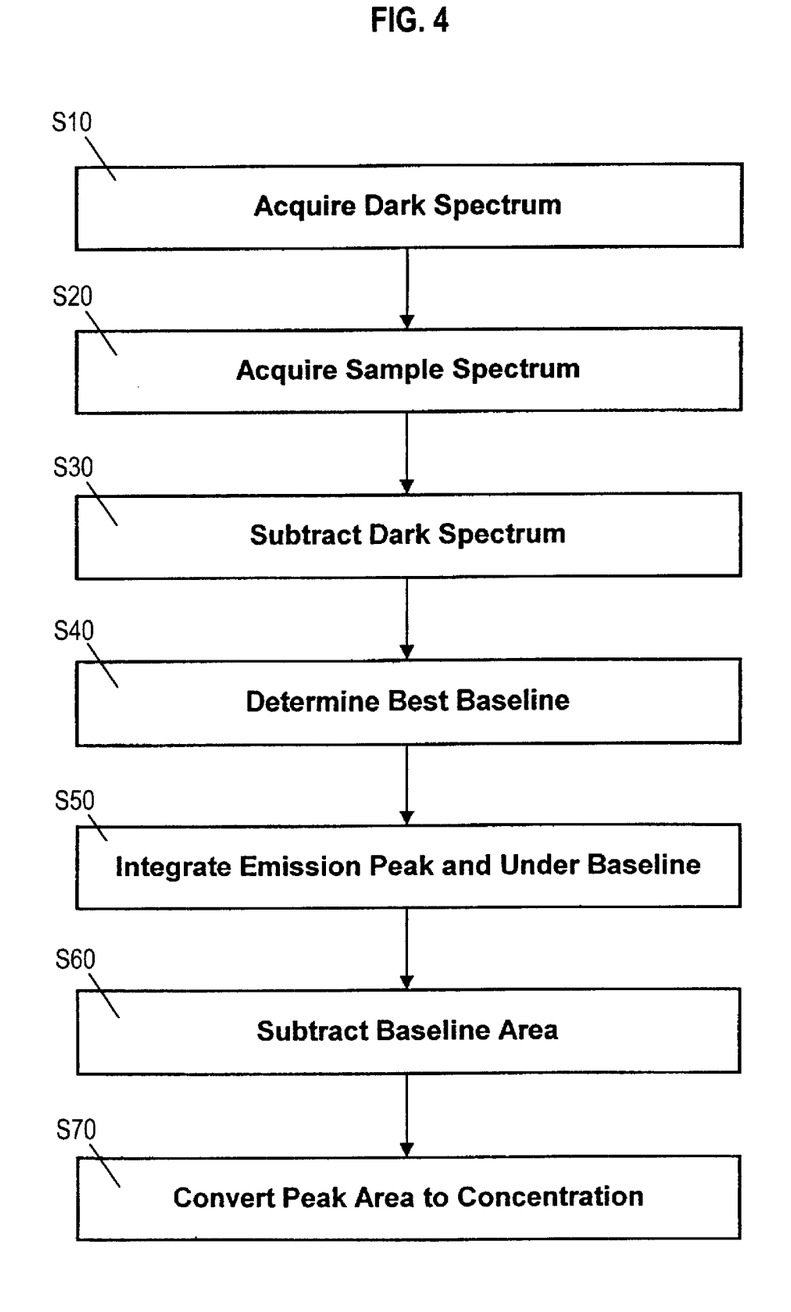
FIG. 4 is a flowchart showing the process of analyzing a sample spectrum for a single impurity.
Figure 5A:
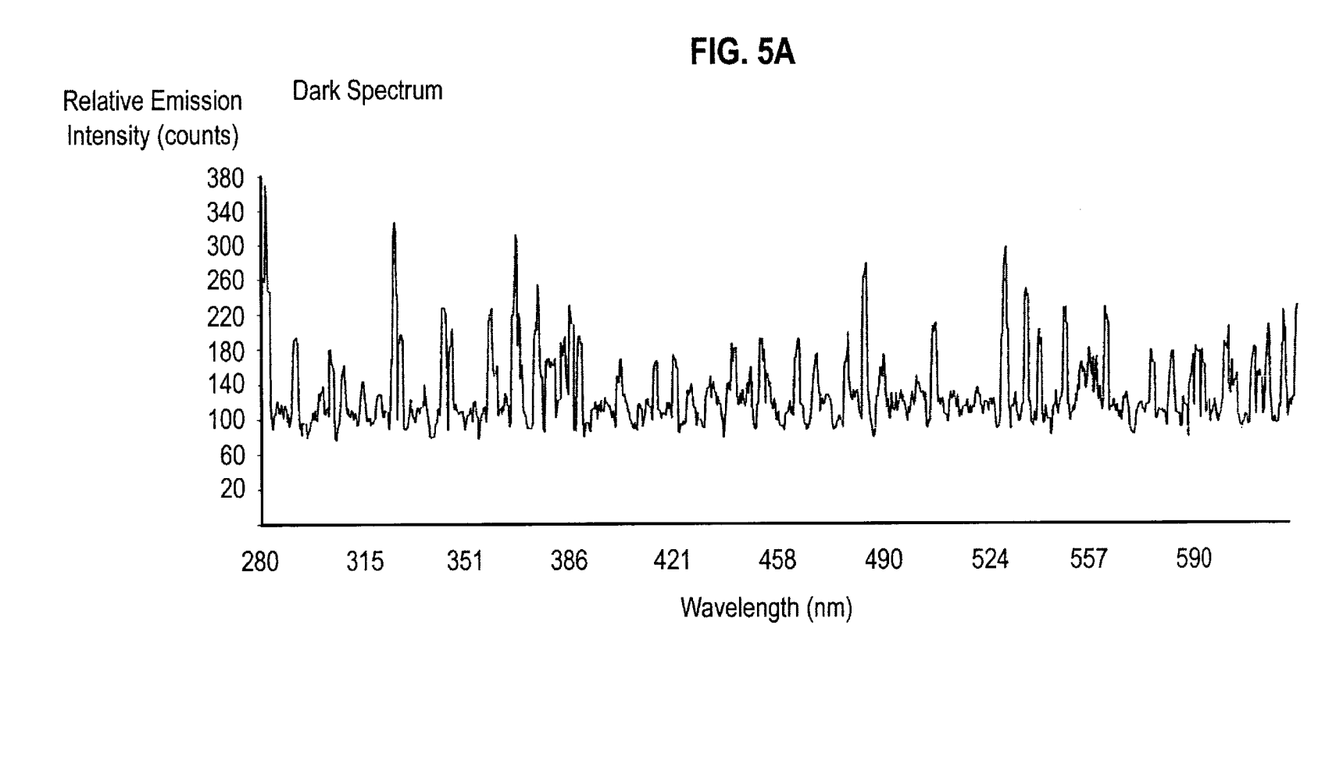
FIGS. 5A–5C are graphs showing an example of dark spectrum subtraction according to the process shown in FIG. 4.
Figure 5B:
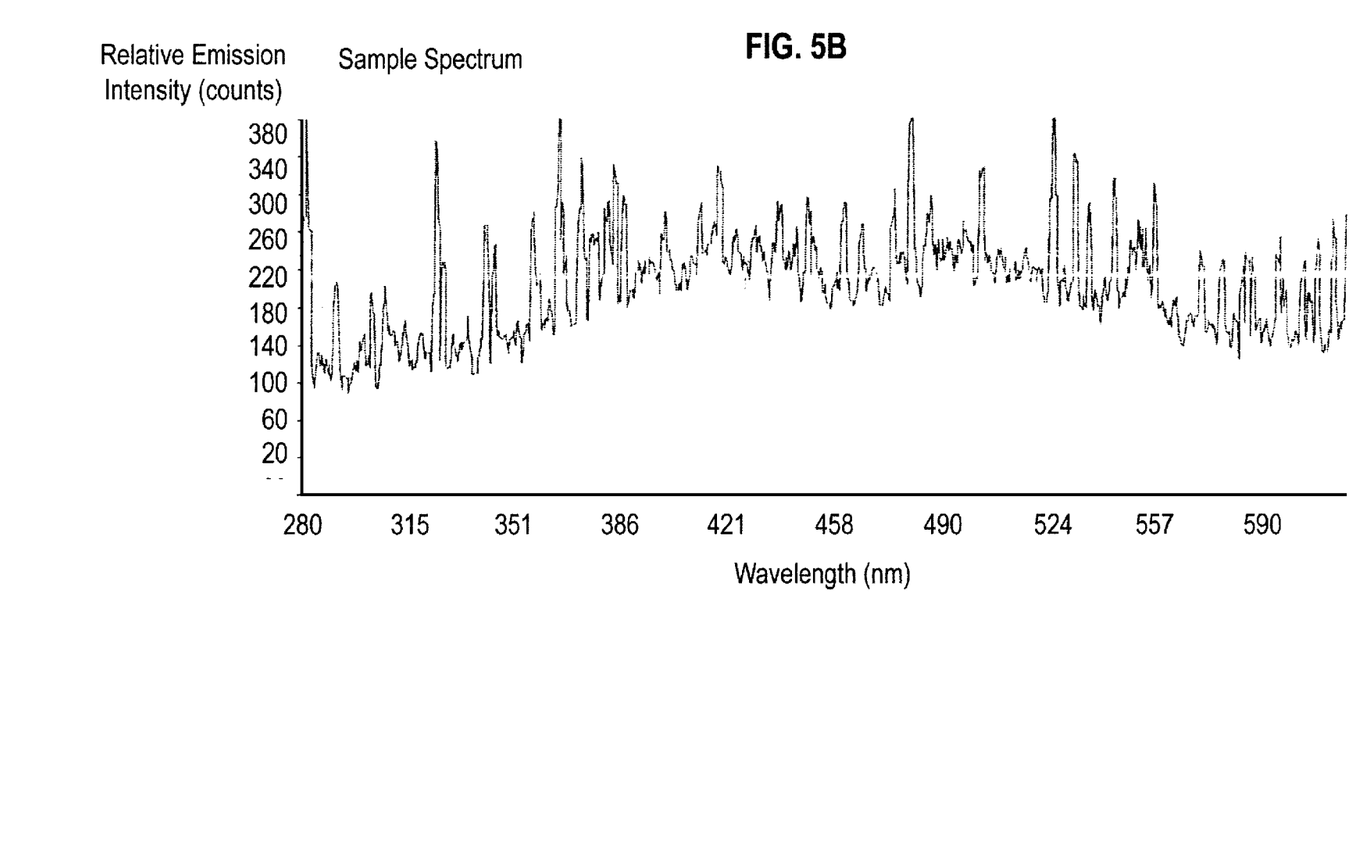
Figure 5C:
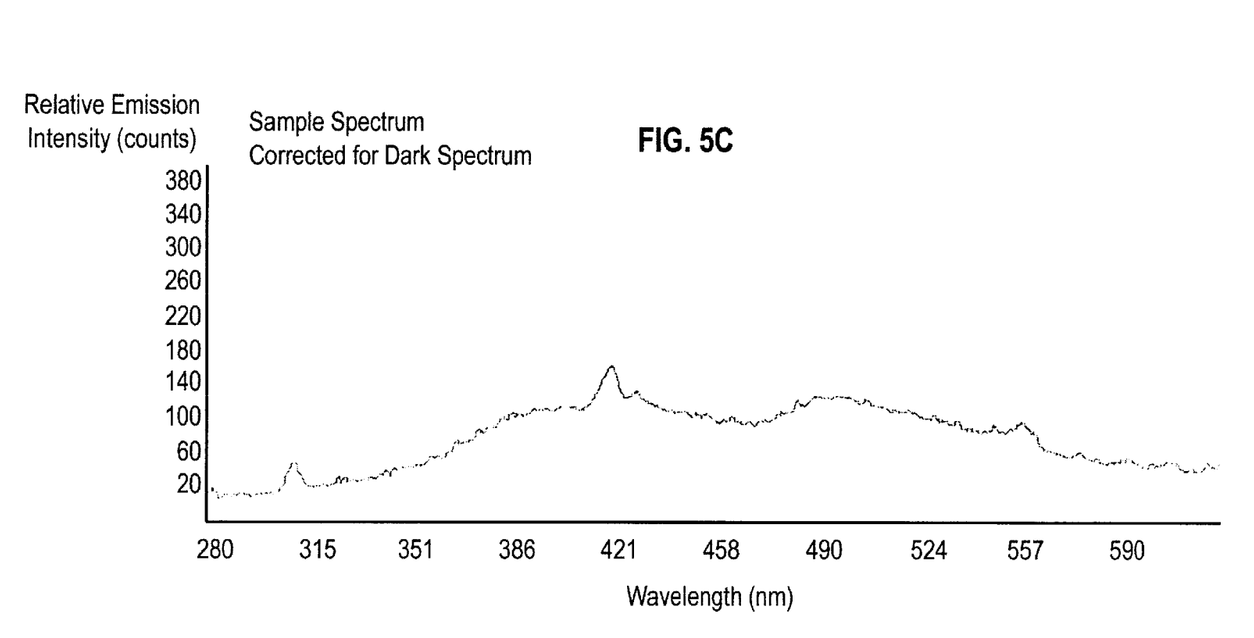

Now referring to FIG. 4, a flowchart is shown depicting the process whereby an analyzer constructed in accordance with the preferred embodiment analyzes a spectrum for impurities in a gas sample. This process corrects the spectrum data to account for the analyzer's use of a CCD array and a low-level emission source. FIG. 4 shows the steps required to generate concentration information for a single impurity from a single sample spectrum. The first step S10 is to acquire a dark spectrum from the array before the plasma discharge is established. It is important for the dark spectrum to be acquired using exactly the same integration time as the subsequent sample spectra, or the correction procedure will not work. As noted above, this is because the characteristics of the dark spectrum are in part a function of integration time. As discussed previously, the dark spectrum is obtained by measuring the CCD output when no light is incident on the array. An exemplary dark spectrum is shown in FIG. 5A. Once the dark spectrum is acquired and stored, preferably in the on-board computer 20, the plasma discharge is ignited and the sample spectrum is acquired (Step S20). FIG. 5B shows an exemplary sample spectrum acquired with the same integration time as the dark spectrum shown in FIG. 5A. FIG. 5B is a sample spectrum for an argon gas stream containing 30 ppb of moisture impurity. In step S30, the dark spectrum value is now subtracted on a pixel-by-pixel basis from the sample spectrum. As shown in FIG. 5C, the resulting sample spectrum corrected for the dark spectrum has a greatly reduced noise signature. The remaining steps of the analysis use this corrected spectrum (i.e. FIG. 5C). Note that the 30 ppb moisture peak at 308 nm is now clearly visible in the corrected spectrum.

Figure 6:
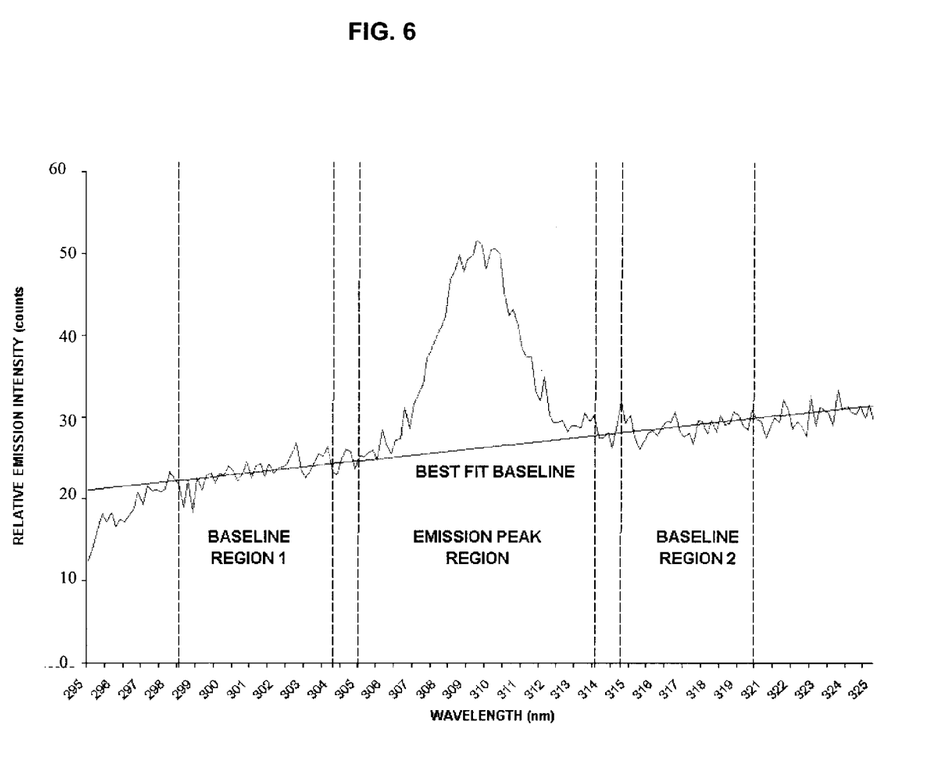
FIG. 6 is a graph showing an example of baseline evaluation according to the process shown in FIG. 4.

The next step S40 is to determine the best baseline underneath the emission line or peak. This step allows the on-board computer 20 to differentiate the light intensity of the sample gas from that of the impurity. First, the process breaks the sample spectrum around the emission peak into three regions. This is shown graphically in FIG. 6 for a 30 ppb moisture peak in an argon gas sample.

The two baseline regions, baseline regions 1 and 2, on either side of the emission peak region are used to determine the baseline. The data points in these regions are fit to a first order regression to determine the best fit straight line through the two sets of data. Once the slope and intercept of this line have been determined, a baseline value for each pixel in the emission peak region, can be calculated. Referring again to FIG. 6, the baseline calculated based on the data in baseline regions 1 and 2 is shown as the best fit baseline. A straight line fit (a linear regression) is computationally the fastest and easiest algorithm that may be used to determine the best fit function, and generally provides a good fit to the baseline data. If however, the baseline region around the emission peak contains dramatic changes, a different regression algorithm can be used to fit a more complex baseline.

With the baseline constructed under the emission peak of interest, the next step S50 is to determine the area both under the emission peak, and under the constructed baseline in the emission peak region. These area calculations can be performed using any one of a number of well-known numerical integration techniques, for example the trapezoid rule.

Once the areas of the emission peak and the baseline in the emission peak region have been calculated, the next step S60 is to subtract the baseline area from the total emission peak area. The resulting area is the area under the emission peak due to the impurity of interest. The key point here is that the baseline area is due to the background light level from the plasma discharge, whereas the peak area from the emission line is due only to the impurity of interest. If the background level shifts for any reason it will be reflected in the position of the baseline and the calculated baseline area. Once the baseline area is subtracted out, the resulting emission peak area remains constant for a given impurity concentration.

Figure 7:
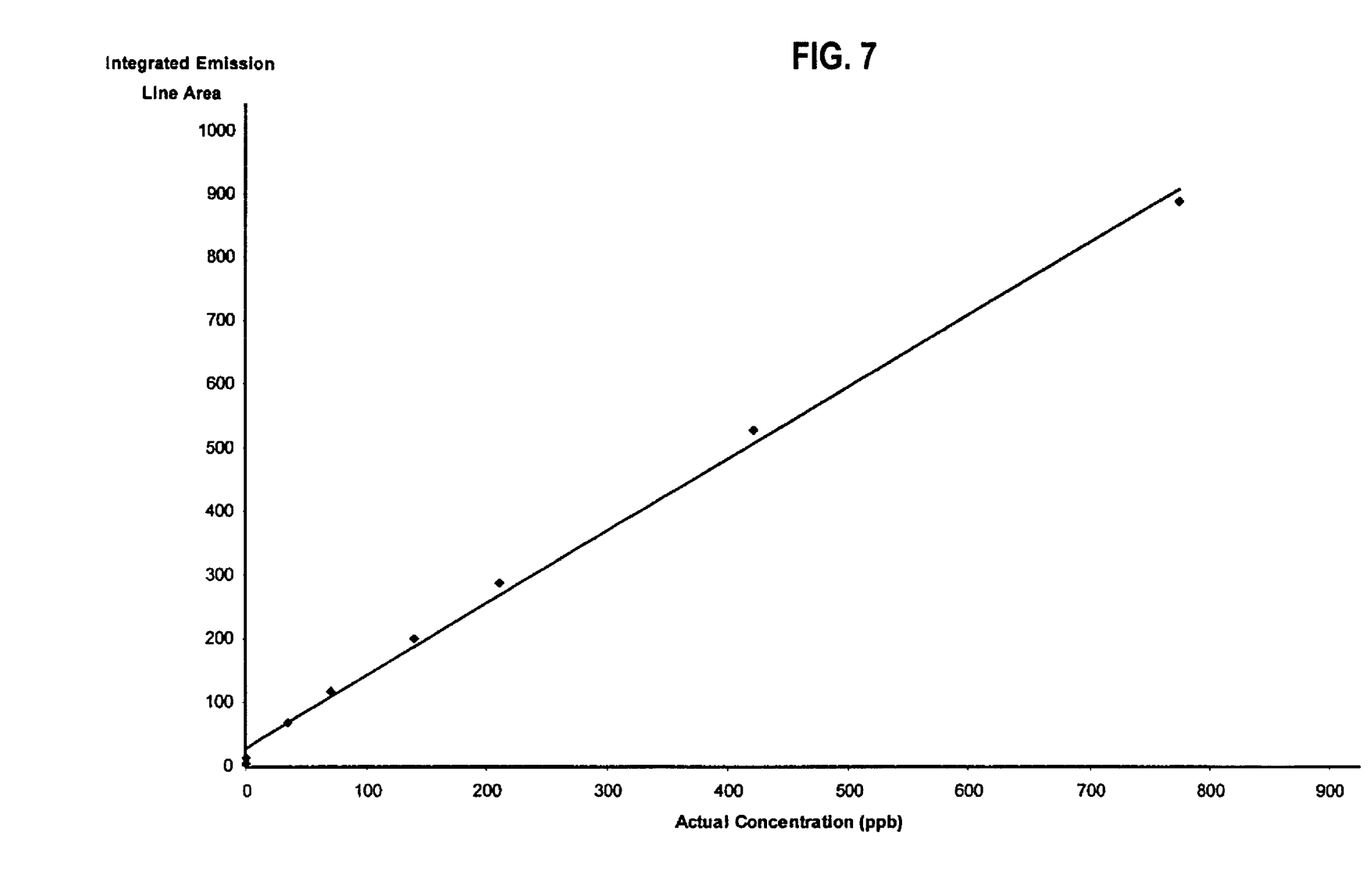
FIG. 7 is a calibration curve for use in converting the emission peak area to an impurity concentration, in accordance with Step S70 of FIG. 4.

The final step S70 is to relate the resulting emission peak area to an impurity concentration S70. Beforehand, a calibration curve is generated by measuring the emission peak area for a series of known concentration standards for the impurity of interest. Such a calibration curve is shown for a moisture impurity in FIG. 7. From the calibration curve, an equation can be determined that gives the concentration of moisture for any measured emission peak area, at least over the range covered by the calibration curve. In this manner, the emission peak area is converted into a concentration number (in ppb) for the impurity of interest.

This process can be repeated for any number of emission lines in the spectrum corresponding to impurities of interest. Examples of such impurities are nitrogen and methane, in addition to moisture as used in the above example.

The tremendous improvement in noise reduction due to the subtraction of the dark spectrum is apparent in FIG. 5C. Any remaining noise due to the dark spectrum correction would affect the baseline evaluation algorithm and manifest itself as noise in the calculated emission peak area and the resulting reported impurity concentration. This would ultimately degrade the limit of detection for the impurity. At the long integration times (2–10 seconds) required to obtain the required sensitivity, management of the dark spectrum can be additionally addressed using the following three complimentary approaches: 1) subtraction of the current dark spectrum from each new sample spectrum; 2) monitoring the temperature and the rate of change in the temperature of the spectrometer to update the dark spectrum when the temperature varies by more than a certain value; and 3) dynamically masking temperature sensitive "hot" pixels in software, so that they are omitted from subsequent analysis. Each of these approaches attempts to address the thermal sensitivity problem of the CCD array. As the spectrometer warms or cools, the initially acquired dark spectrum becomes a poorer estimate of the correction that should be made to the current sample spectrum. The greater the temperature difference between the current temperature and the temperature at which the dark spectrum was taken, the poorer the estimate and the more noise that shows up in the corrected sample spectrum. Temperature differences as small as 1° C. can result in unacceptable noise levels in corrected sample spectra.

The first approach is to subtract the initial dark spectrum for each gas sample to be analyzed. Essentially, this approach simply repeats step S20 to S70 in FIG. 4 for each sample.

The second approach addresses thermal sensitivity by monitoring the temperature and/or the rate of change in the temperature of the spectrometer. To monitor the temperature, the on-board computer 20 is equipped with two or more redundant temperature sensors (not shown). The computer continually monitors the operation of the two sensors. If the primary sensor fails, the computer uses the output from the secondary (backup) sensor. Preferably, the sensors are located close to the CCD array to provide an accurate indication of the detector temperature, which is the key measurement. The sensors may be read at regularly predetermined intervals to provide a temperature measurements.

The on-board computer 20 constantly evaluates the temperature difference between the current temperature and the temperature at which the dark spectrum was most recently acquired and also the rate of change of the temperature. Depending on the rate of change, the on-board computer 20 sets an acceptable delta-temperature. The faster the rate of change, the larger the delta-temperature that will be allowed. This is to avoid updating the dark spectrum, as described in the following paragraphs, too frequently.

In normal operation, the on-board computer 20 collects and analyzes a sample spectrum typically every 30–40 seconds. If the delta-temperature is exceeded during an analysis, the current sample is finished and further analysis is suspended. The on-board computer 20 turns off power to the high voltage transformer 50, thereby extinguishing the plasma discharge. The spectrometer 10 is then instructed to acquire a new dark spectrum while the emission source is extinguished. The new dark spectrum replaces the previously stored dark spectrum and the current temperature (TDARK) is recorded.

The on-board computer 20 then turns on the high voltage transformer 50, thereby re-establishing the plasma discharge. The on-board computer 20 returns to normal operation and begins acquiring sample spectra again. The computer also continues to compare the current temperature to TDARK, where TDARK is the value at which the latest dark spectrum was acquired.

Figure 8:
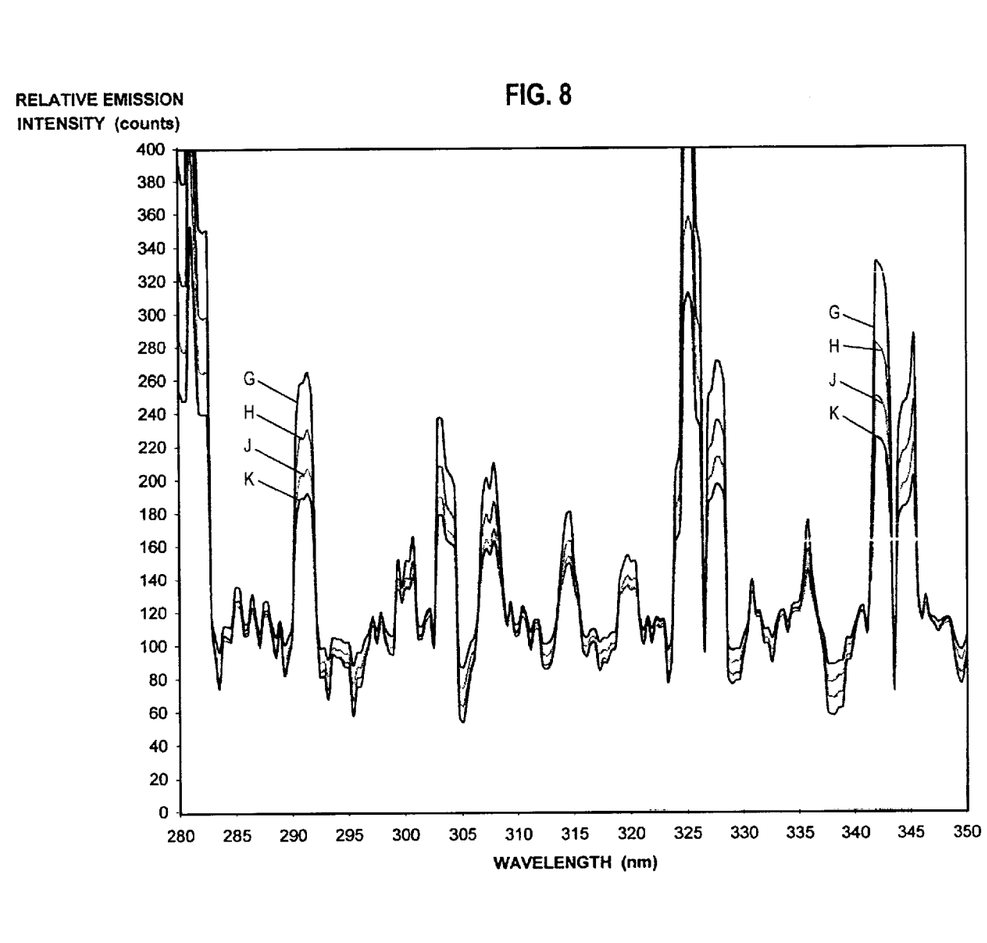
FIG. 8 is a graph of the dark spectrum as a function of temperature illustrating hot pixel regions.

The problem addressed by the third approach is illustrated in FIG. 8. FIG. 8 is a graph of four dark spectra—K, J, H, G—at 27°, 30°, 33°, and 36° C., respectively. As shown, the emission intensity generally increases with temperature. Note that several groups of pixels, notably in this example around 326 nm and 344 nm, not only exhibit higher thermal noise than their neighbors but the temperature variation is also much greater. By identifying and then ignoring or masking these pixels each array can be made to perform as a much higher quality detector. This is done by categorizing the individual detector elements into good and bad or so called "hot" pixels. About 5% of a given CCD array can generally be categorized as hot pixels. The number and distribution of hot pixels is different for each CCD array. Hot pixels typically have higher dark spectrum values than good pixels. Research has uncovered two other interesting and useful aspects of hot pixel behavior. First, hot pixels tend to occur in small contiguous groups, rather than singly. And, hot pixels tend to get noisier in response to a temperature increase faster than good pixels. Both of these behaviors can be seen in FIG. 8, which shows dark spectra at several temperatures from the region of interest for moisture and nitrogen analysis. Note the two regions of hot pixels around 326 nm and 344 nm. These two groups of hot pixels occur in the baseline region for nitrogen analysis and may cause problems for the baseline evaluation algorithm.

Figure 9:
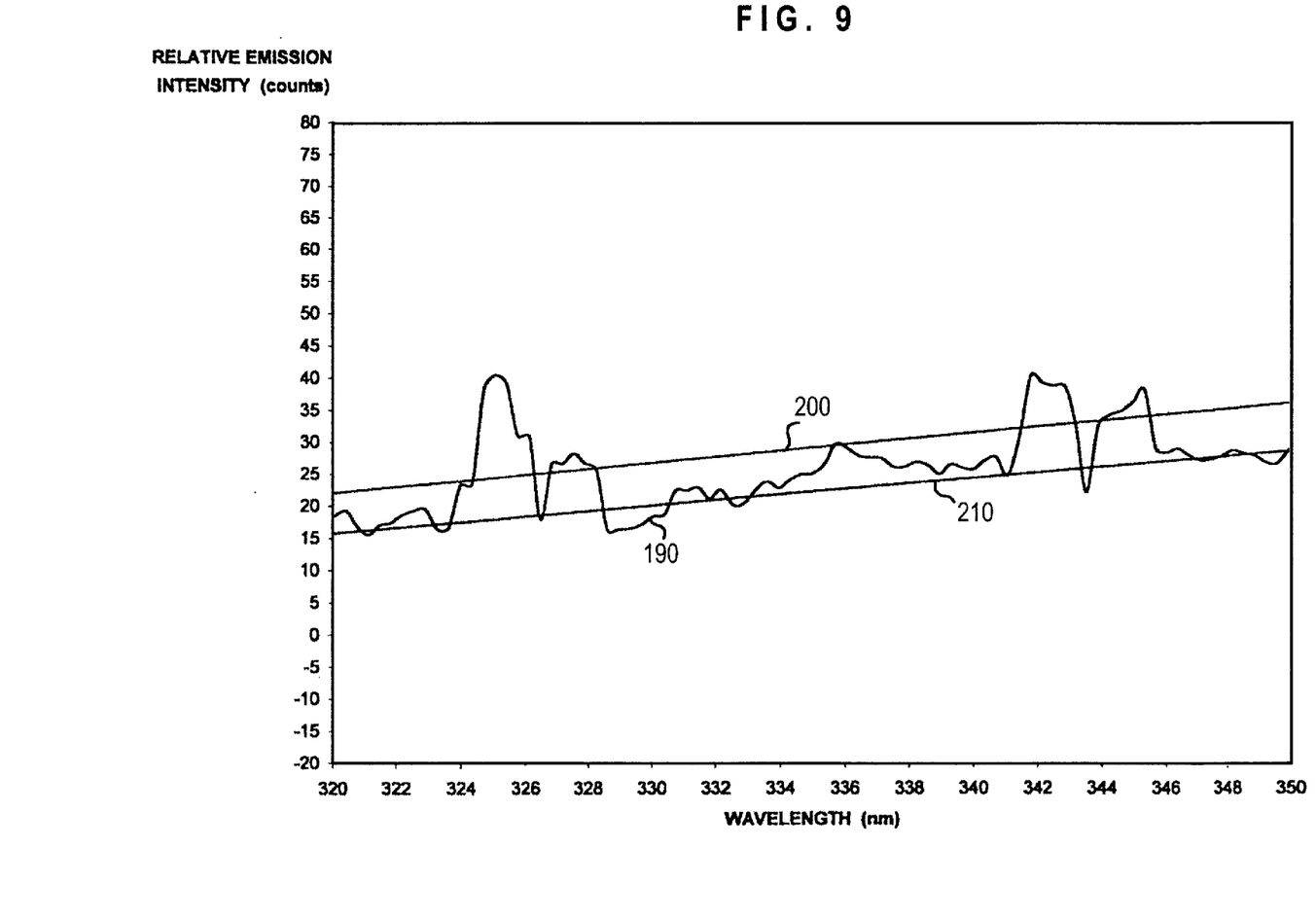
FIG. 9 is a graph showing the effect of hot pixels on baseline evaluation.

For this CCD array, the effect of the hot pixels on the baseline evaluation for nitrogen can be seen in FIG. 9. The data shown in FIG. 9 corresponds to an enlarged view of the region in FIG. 8 containing the two regions of hot pixels described above. Notice the two upsets in the baseline of the spectral data 190 located around 324 nm and 344 nm, respectively. These upsets correspond to the two noisy groups of hot pixels discussed in FIG. 8. These upsets cause the baseline evaluation algorithm to generate the best fit baseline 200, shown in FIG. 9. It is readily apparent that baseline 200 is high in the emission peak region. In fact, this baseline results in the integration algorithm generating a negative area for the nitrogen peak emission line, instead of the expected zero area. If the hot pixels (i.e. the upsets) are masked, the second baseline 210 in FIG. 9 is generated. Baseline 210 is statistically a much better fit. Using this baseline 210, the peak area is calculated as zero, as is expected for this sample.

Masks are easily generated in software by analyzing the dark spectrum for the array. In effect, a custom generated software mask is created and laid over the array. The good pixels are unaffected and the bad pixels are ignored. The operating program implements this generated mask each time it considers using a pixel value for either an emission line data point or a baseline point. Thus, for a pixel to be used in an analysis, it must be located in the right wavelength region and be a good pixel.

Another feature of the present invention is the use of Praxair's microcell sampling system. Praxair's microcell sample system is described in U.S. Pat. No. 6,043,881. This sample cell has a minimal volume and no unswept areas which helps to improve response time. With the baseline evaluation algorithm discussed above, small changes in sample cell pressure or flowrate have minimal impact on the analytical results. Because of this, the sample system can be extremely simple which again improves response time and makes the analyzer easy to use. The microcell has an orifice on the inlet fitting that allows the user to connect the analyzer to the sample point without the use of a regulator. Eliminating the regulator, that is normally required in sample systems, removes the single component that slows analyzer response time the most.

The analyzer according to the present invention is described herein as using an argon gas sample. However, the analyzer is not limited to use with argon and can be readily adapted for use with any noble gas, such as helium and krypton. In addition, analyses of hydrogen and oxygen sample gases can be accomplished. Some exemplary impurities that can be analyzed are nitrogen, moisture and methane. Moisture can be analyzed in any base gas if an appropriate membrane is used.

Another approach enabling the use of longer integration times is to thermoelectrically cool the CCD array. Thermoelectric coolers are commercially available, but add significant cost to the system (almost doubling the cost) and are bulky. The temperature compensation approaches described above can also be used with a cooled array and will yield better detection limits than the use of cooling alone.

The analyzer can operate over varying sample inlet pressure ranges. Exemplary ranges span low pressure 5–50 psig, standard pressure 20–150 psig, and high pressure 50–350 psig. Different ranges are available simply by changing the diameter of the critical flow orifice in the inlet fitting described above. Each of the ranges above corresponds to a sample flow rate of approximately 400–2000 cc/min (0.8–4.0 cfh) through the sample cell. Even a very low pressure version of the analyzer can be effected by drawing a higher vacuum with a sample pump on the analyzer vent in relation to the inlet. The microcell can withstand operation under vacuum conditions.

While the preferred embodiments of the present invention have been described using specific terms, such description is for illustrative purposes only, and it is to be understood that changes and variations may be made without departing from the spirit or scope of the appended claims.

What is claimed is:

1. An analyzer for performing gaseous emission spectroscopy, comprising:
   an analytical cell containing a gas sample for spectrum analysis;
   a transformer for providing a voltage across said gas sample in said analytical cell sufficient to produce a low-level emission source from said gas sample;
   a spectrometer for detecting an emission spectrum of said low-level emission source, said spectrometer having a charge coupled device array as a detector; and a computer for controlling said analyzer and for analyzing the emission spectrum detected by said spectrometer.

2. The analyzer according to claim 1, wherein said low-level emission source is a silent electric discharge.

3. The analyzer according to claim 1, wherein said analytical cell is a microcell.

4. The analyzer according to claim 1, further comprising a fiber-optic cable for coupling the light emitted by said low-level emission source into said spectrometer.

5. The analyzer according to claim 1, wherein said computer calculates an impurity concentration for various impurities in said gas sample using a calibration curve.

6. The analyzer according to claim 1, wherein said computer subtracts a dark spectrum from the emission spectrum, the dark spectrum representing thermal noise from said charge coupled device detector.

7. The analyzer according to claim 6, wherein said computer monitors the temperature of said spectrometer and controls said spectrometer to generate a current dark spectrum when a predetermined temperature change occurs, said computer subtracting the current dark spectrum from the emission spectrum.

8. The analyzer according to claim 1, wherein said computer dynamically determines and masks hot pixels in said charge coupled device detector, so that the masked hot pixels are not used in the spectrum analysis.

9. A method of processing emission spectra from an analyzer having a charge coupled device array based gaseous emission spectrometer and a low-level emission source, comprising the steps of:

acquiring a dark spectrum from said charge coupled device array;

acquiring a sample spectrum from said low-level emission source using said charge coupled device array, said low-level emission source being produced from a gas sample in an analytical cell;

subtracting said dark spectrum from said sample spectrum to obtain a corrected sample spectrum;

determining a baseline for said corrected sample spectrum;

integrating an emission peak area and a baseline area for an emission peak region of said corrected sample spectrum;

subtracting said baseline area from said emission peak area to obtain a peak area; and converting said peak area into an impurity concentration.

10. The method according to claim 9, wherein said low-level emission source is a silent electric discharge.

11. The method according to claim 9, wherein said analytical cell is a microcell.

12. The method according to claim 9, wherein a fiber-optic cable couples the light emitted by said low-level emission source into the gaseous emission spectrometer.

13. The method according to claim 9, wherein said converting step calculates said impurity concentration for various impurities in said gas sample using a calibration curve.

14. The method according to claim 9, wherein said dark spectrum represents thermal noise from said charge coupled device array.

15. The method according to claim 9, wherein the dark spectrum acquiring step acquires said dark spectrum by measuring the output of said charge coupled device array without incident light.

16. The method according to claim 9, wherein the dark spectrum acquiring step acquires said dark spectrum when said spectrometer exceeds a predetermined temperature change from the temperature at which the dark spectrum was last acquired.

17. The method according to claim 9, wherein the determined best baseline step dynamically masks hot pixels in said charge coupled device array, so that the masked hot pixels are not used in the spectrum analysis.

18. A method of processing emission spectra, comprising the steps of:

containing a gas sample for spectrum analysis in an analytical cell;

providing a voltage across said gas sample in said analytical cell sufficient to produce a low-level emission source from said gas sample;

detecting an emission spectrum of said low-level emission source using a spectrometer having a charge coupled device array as a detector; and analyzing the emission spectrum detected by said spectrometer.

19. The method according to claim 18, wherein said low-level emission source is a silent electric discharge.

20. The method according to claim 18 wherein said analytical cell is a microcell.

21. The method according to claim 18, further comprising the step of coupling the light emitted by said low-level emission source into said spectrometer using a fiber-optic cable.

22. The method according to claim 18, further comprising the step of calculating an impurity concentration for various impurities in said gas sample using a calibration curve.

23. The method according to claim 18, further comprising the step of subtracting a dark spectrum from the emission spectrum, the dark spectrum representing thermal noise from said charge coupled device detector.

24. The method according to claim 23, further comprising the step of generating a current dark spectrum for each gas sample and subtracting the current dark spectrum from the emission spectrum.

25. The method according to claim 23, further comprising the step of monitoring the temperature of said spectrometer and controlling said spectrometer to generate a current dark spectrum when a predetermined temperature change occurs, the current dark spectrum being subtracted from the emission spectrum.

26. The method according to claim 18, further comprising the step of dynamically determining and masking hot pixels in said charge coupled device array, so that the masked hot pixels are not used in the spectrum analysis.

27. An analyzer having a charge coupled device array based gaseous emission spectrometer and a low-level emission source for processing emission spectra, comprising:

an analytical cell containing a gas sample for spectrum analysis; said gas sample producing said low-level emission source;

said charge coupled device array acquiring a dark spectrum and a sample spectrum from said low-level emission source;

a computer for subtracting said dark spectrum from said sample spectrum to obtain a corrected sample spectrum, determining a baseline for said corrected sample spectrum, integrating an emission peak area and a baseline area for an emission peak region of said corrected sample spectrum, subtracting said baseline area from said emission peak area to obtain a peak area, and converting said peak area into an impurity concentration.

28. The analyzer according to claim 27, wherein said low-level emission source is a silent electric discharge.

29. The analyzer according to claim 27 wherein said analytical cell is a microcell.

30. The analyzer according to claim 27, wherein a fiber-optic cable couples the light emitted by said low-level emission source into the gaseous emission spectrometer.

31. The analyzer according to claim 27, wherein said computer calculates said impurity concentration for various impurities in said gas sample using a calibration curve.

32. The analyzer according to claim 27, wherein said dark spectrum represents thermal noise from said charge coupled device array.

33. The analyzer according to claim 27, wherein said dark spectrum is acquired by measuring the output of said charge coupled device array without incident light.

34. The analyzer according to claim 27, wherein said dark spectrum is acquired when the spectrometer exceeds a predetermined temperature change from the temperature at which the dark spectrum was last acquired.

35. The analyzer according to claim 27, wherein said computer determines and dynamically masks hot pixels in said charge coupled device array, so that the masked hot pixels are not used in the spectrum analysis.

* * * * *